(12) United States Patent
Szczerba et al.

(10) Patent No.: US 8,633,979 B2
(45) Date of Patent: Jan. 21, 2014

(54) AUGMENTED ROAD SCENE ILLUSTRATOR SYSTEM ON FULL WINDSHIELD HEAD-UP DISPLAY

(75) Inventors: Joseph F. Szczerba, Grand Blanc, MI (US); Thomas A. Seder, Northville, MI (US); Dehua Cui, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 443 days.

(21) Appl. No.: 12/980,612

(22) Filed: Dec. 29, 2010

(65) Prior Publication Data
US 2012/0169861 A1    Jul. 5, 2012

(51) Int. Cl.
*H04N 7/18*    (2006.01)
*G06K 9/00*    (2006.01)

(52) U.S. Cl.
USPC ............................................ 348/78; 382/103

(58) Field of Classification Search
USPC ........... 348/78, 77; 345/7, 173, 8, 9; 340/435, 340/436, 903, 901, 902, 904, 438, 425.5, 340/937; 359/630, 633; 701/400–541; 382/103
See application file for complete search history.

(56) References Cited

U.S. PATENT DOCUMENTS

| | | | |
|---|---|---|---|
| 6,100,517 A | 8/2000 | Yahav et al. | |
| 6,847,336 B1 * | 1/2005 | Lemelson et al. | 345/8 |
| 6,986,581 B2 | 1/2006 | Sun et al. | |
| 7,090,355 B2 | 8/2006 | Liu et al. | |
| 7,182,467 B2 | 2/2007 | Liu et al. | |
| 7,213,923 B2 | 5/2007 | Liu et al. | |
| 7,460,951 B2 | 12/2008 | Altan et al. | |
| 8,098,170 B1 * | 1/2012 | Szczerba et al. | 340/905 |
| 8,098,171 B1 | 1/2012 | Szczerba et al. | |
| 8,395,529 B2 * | 3/2013 | Seder et al. | 340/905 |
| 2007/0164990 A1 * | 7/2007 | Bjorklund et al. | 345/156 |
| 2007/0241936 A1 * | 10/2007 | Arthur et al. | 340/958 |
| 2008/0086240 A1 * | 4/2008 | Breed | 701/1 |
| 2008/0158510 A1 | 7/2008 | Tant et al. | |
| 2009/0268946 A1 | 10/2009 | Zhang et al. | |
| 2010/0020078 A1 | 1/2010 | Shpunt | |
| 2010/0253489 A1 | 10/2010 | Cui et al. | |
| 2010/0253492 A1 | 10/2010 | Seder et al. | |
| 2010/0253493 A1 | 10/2010 | Szczerba et al. | |
| 2010/0253526 A1 | 10/2010 | Szczerba et al. | |
| 2010/0253539 A1 | 10/2010 | Seder et al. | |
| 2010/0253540 A1 | 10/2010 | Seder et al. | |
| 2010/0253541 A1 | 10/2010 | Seder et al. | |

(Continued)

FOREIGN PATENT DOCUMENTS

JP    2005-138755    *    6/2005    ............... G09G 5/00
WO    WO-2007043036 A1    4/2007

OTHER PUBLICATIONS

U.S. Appl. No. 12/467,340, not publ'd, Szczerba et al.
U.S. Appl. No. 12/467,350, not publ'd, Seder et al.

(Continued)

*Primary Examiner* — Behrooz Senfi (57) ABSTRACT

A method to dynamically register a graphic on a driving scene of a vehicle utilizing a graphic projection display includes monitoring a user input indicated to a portion of the graphic projection display, determining a graphic representing a user-defined content based on the monitored user input indicated to the portion of the graphic projection display, dynamically registering a location of the graphic upon the graphic projection display corresponding to the driving scene of the vehicle, and displaying the graphic upon the graphic projection display.

19 Claims, 5 Drawing Sheets

(56) References Cited

U.S. PATENT DOCUMENTS

| | | |
|---|---|---|
| 2010/0253542 A1 | 10/2010 | Seder et al. |
| 2010/0253543 A1 | 10/2010 | Szczerba et al. |
| 2010/0253593 A1* | 10/2010 | Seder et al. .................. 345/7 |
| 2010/0253594 A1 | 10/2010 | Szczerba et al. |
| 2010/0253595 A1 | 10/2010 | Szczerba et al. |
| 2010/0253596 A1 | 10/2010 | Szczerba et al. |
| 2010/0253597 A1 | 10/2010 | Seder et al. |
| 2010/0253598 A1 | 10/2010 | Szczerba et al. |
| 2010/0253599 A1 | 10/2010 | Szczerba et al. |
| 2010/0253600 A1 | 10/2010 | Seder et al. |
| 2010/0253601 A1 | 10/2010 | Seder et al. |
| 2010/0253602 A1 | 10/2010 | Szczerba et al. |
| 2010/0253688 A1 | 10/2010 | Cui et al. |
| 2010/0253918 A1 | 10/2010 | Seder et al. |
| 2010/0254019 A1 | 10/2010 | Cui et al. |
| 2010/0289632 A1 | 11/2010 | Seder et al. |
| 2010/0292886 A1 | 11/2010 | Szczerba et al. |
| 2011/0141041 A1* | 6/2011 | Parkinson et al. ............ 345/173 |
| 2012/0089273 A1 | 4/2012 | Seder et al. |
| 2012/0093357 A1 | 4/2012 | Seder et al. |
| 2012/0169513 A1 | 7/2012 | Szczerba et al. |
| 2012/0169572 A1 | 7/2012 | Seder et al. |
| 2012/0173067 A1 | 7/2012 | Szczerba et al. |
| 2012/0173069 A1 | 7/2012 | Tsimhoni et al. |
| 2012/0174004 A1 | 7/2012 | Seder et al. |

OTHER PUBLICATIONS

U.S. Appl. No. 12/900,566, not publ'd, Szczerba et al.
U.S. Appl. No. 12/900,539, not publ'd, Szczerba et al.
U.S. Appl. No. 12/903,267, not publ'd, Szczerba et al.
U.S. Appl. No. 12/980,503, not publ'd, Szczerba et al.
U.S. Appl. No. 12/979,432, not publ'd, Szczerba et al.
U.S. Appl. No. 12/980,522, not publ'd, Szczerba et al.
U.S. Appl. No. 12/981,602, not publ'd, Szczerba et al.
U.S. Appl. No. 12/982,478, not publ'd, Szczerba et al.

* cited by examiner

AUGMENTED ROAD SCENE ILLUSTRATOR SYSTEM ON FULL WINDSHIELD HEAD-UP DISPLAY

TECHNICAL FIELD

This disclosure is related to displaying user-defined content upon a graphic projection display corresponding to a driving scene of a vehicle.

BACKGROUND

The statements in this section merely provide background information related to the present disclosure and may not constitute prior art.

Occupants in a vehicle may desire to identify features or objects located on a road scene for communication with other occupants. For instance, a driver may notice a rain cloud and may wish to identify the rain cloud to another occupant. However, identifying features or objects to other passengers can be confusing because it requires the occupant to physically point to- or use a series of descriptions to identify such features or objects. Additionally, it is distracting for a driver to physically point out a feature or object on the driving scene.

Head-up displays project light upon a screen and the light is converted into a viewable display upon the screen. Head-up displays are known to present information to the operator of the vehicle in an effective manner by reducing strain upon the operator while allowing the operator to remain focused on driving.

SUMMARY

A method to dynamically register a graphic on a driving scene of a vehicle utilizing a graphic projection display includes monitoring a user input indicated to a portion of the graphic projection display, determining a graphic representing a user-defined content based on the monitored user input indicated to the portion of the graphic projection display, dynamically registering a location of the graphic upon the graphic projection display corresponding to the driving scene of the vehicle, and displaying the graphic upon the graphic projection display.

BRIEF DESCRIPTION OF THE DRAWINGS

One or more embodiments will now be described, by way of example, with reference to the accompanying drawings, in which.

DETAILED DESCRIPTION

Figure 1:
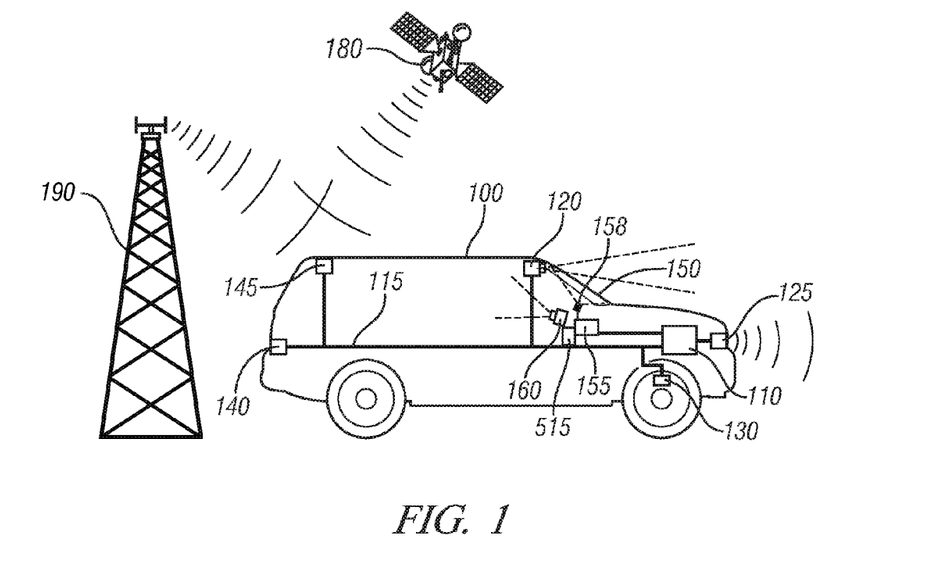
FIG. 1 illustrates an exemplary vehicle equipped with an EVS system, in accordance with the present disclosure.

Referring now to the drawings, wherein the showings are for the purpose of illustrating certain exemplary embodiments only and not for the purpose of limiting the same, FIG. 1 illustrates an exemplary vehicle equipped with an EVS system, in accordance with the present disclosure. An exemplary EVS system is disclosed in Co-pending U.S. application Ser. No. 12/417,077, which is incorporated herein by reference. For purposes of this disclosure, the terms 'operator', 'user' and 'driver' will be used interchangeably herein. The vehicle 100 includes an EVS system manager 110; a user input module (UIM) 515; a graphic projection display 250 (shown in FIG. 2), vehicle sensor systems, including camera system 120 and radar system 125; vehicle operation sensors, including vehicle speed sensor 130; information systems, including GPS device 140 and wireless communication system 145; head-up display (HUD) 150; EVS graphics system 155; graphics projection system 158; and occupant eye location sensing system 160. The EVS system manager 110 includes a programmable processor including programming to monitor a user input indicated to a portion of the graphic projection display 250, shown in FIG. 2 and determine a graphic representing user-defined content based on the monitored user input. It will become apparent that the user-defined content can be utilized to communicate with other occupants within the vehicle or memorize content for the user. The EVS system manager can communicate directly with various systems and components, or the EVS system manager can alternatively or additionally communicate over a LAN/CAN system 115. Discussed in further detail with reference to FIG. 4, the UIM 515 receives user inputs indicated to a portion of the graphic projection display 250 (e.g., HUD 150), wherein the user inputs are monitored by the EVS system manager 110. Camera system 120 includes a camera or image capturing device taking periodic or sequential images representing a view from the vehicle. The camera or image capturing device of the camera system 120 preferably includes 360 degrees of coverage. Radar system 125 includes a device known in the art utilizing electromagnetic radiation to detect other vehicles or objects located near the vehicle. A number of known in-vehicle sensors are used within a vehicle to monitor vehicle speed, engine speed, wheel slip, and other parameters representative of the operation of the vehicle. vehicle speed sensor 130 represents one such an in-vehicle sensor, but the scope of the disclosure includes any such sensors for use by the EVS. GPS device 140 and wireless communication system 145 are devices known in the art for communicating with resources outside of the vehicle, for example, satellite system 180 and cellular communications tower 190. GPS device 140 may be utilized in conjunction with a 3D map database including detailed information relating to a global coordinate received by the GPS device 140 regarding the current location of the vehicle. Information from the vehicle sensor systems and the vehicle operation sensors can be utilized by the EVS system manager 110 to monitor the current orientation of the vehicle. HUD 150 includes a windscreen equipped with features capable of displaying an image projected thereupon while remaining transparent or substantially transparent such that occupants of the vehicle can clearly observe outside of the vehicle through the windscreen. One will appreciate that while HUD 150 includes the windscreen in the front of the vehicle, other surfaces within the vehicle could be used for projection, including side windows and a rear window. Additionally, the view on the front windscreen could be continued upon the front vehicle "A-pillars" and onto the side windows as a continuous image. EVS graphics engine 155 includes display software or programming translating requests to display information from the EVS system manager 110 in graphical representations of the information. The EVS graphics engine 155 includes programming to compensate for the curved and tilted surface of the windscreen and any other surfaces (e.g., non-transparent component 280 shown in FIG. 2) onto which graphics are to be projected. EVS graphics engine 155 controls graphics projection system 158 including a laser or projector device producing an excitation light to project the graphical representations. Occupant eye location sensing system 160 includes sensors known in the art to approximate a location of the head of an occupant and further the orientation or gaze location of the eyes of the occupant. Based upon the output of the occupant eye location sensing system 160, the current location and orientation of the vehicle 100 and a user input location, EVS system manager 110 can accurately dynamically register the graphical representations to the HUD 150 (i.e., graphic projection display 250) such that the occupant sees the images overlaid with visual images through the windscreen. Dynamic registration of graphics will be discussed in greater detail with reference to FIG. 5.

The EVS described above includes eye sensing and head sensing devices allowing estimation of eye location, allowing dynamic registration of images upon the graphic projection display 250 (e.g., HUD 150)) such that the images correspond to a view of the operator. However, it will be appreciated that estimation of head and eye location can be achieved through a number of methods. For example, in a process similar to adjusting rearview mirrors, an operator can use a calibration routine upon entering a vehicle to align graphics to a detected object. In another embodiment, seat position longitudinally in the vehicle can be used to estimate a position of the driver's head. In another embodiment, manual adjustment of a rearview mirror or mirrors can be used to estimate location of an operator's eyes. It will be appreciated that a combination of methods, for example, seat position and mirror adjustment angle, can be utilized to estimate operator head location with improved accuracy. Many methods to accomplish accurate dynamic registration of graphics upon the graphic projection display 250 (e.g., HUD 150) are contemplated, and the disclosure is not intended to be limited to the particular embodiments described herein.

An exemplary EVS includes a wide field of view, full windscreen HUD, a substantially transparent screen including functionality to display graphical images projected thereupon; a HUD image engine including a laser or lasers capable of projecting images upon the windscreen, wherein the windscreen is an embodiment of the graphic projection display 250 illustrated in FIG. 2 below; input sources deriving data concerning the operating environment of the vehicle; and an EVS system manager including programming to monitor inputs from the input devices, process the inputs and determine critical information relative to the operating environment, and create requests for graphical images to be created by the HUD image engine. However, it will be appreciated that this exemplary EVS is only one of a wide number of configurations that an EVS can take. For example, a vision or camera system is useful to various EVS applications that will be discussed. However, it will be appreciated that an exemplary EVS system can operate without a vision system, for example, providing information available from only a GPS device, 3D map database, and in-vehicle sensors. In the alternative, it will be appreciated that an exemplary EVS system can operate without access to a GPS device or wireless network, instead utilizing inputs only from a vision system and radar system. Many configurations are possible with the disclosed systems and methods, and the disclosure is not intended to be limited to the exemplary embodiments described herein.

Figure 2:
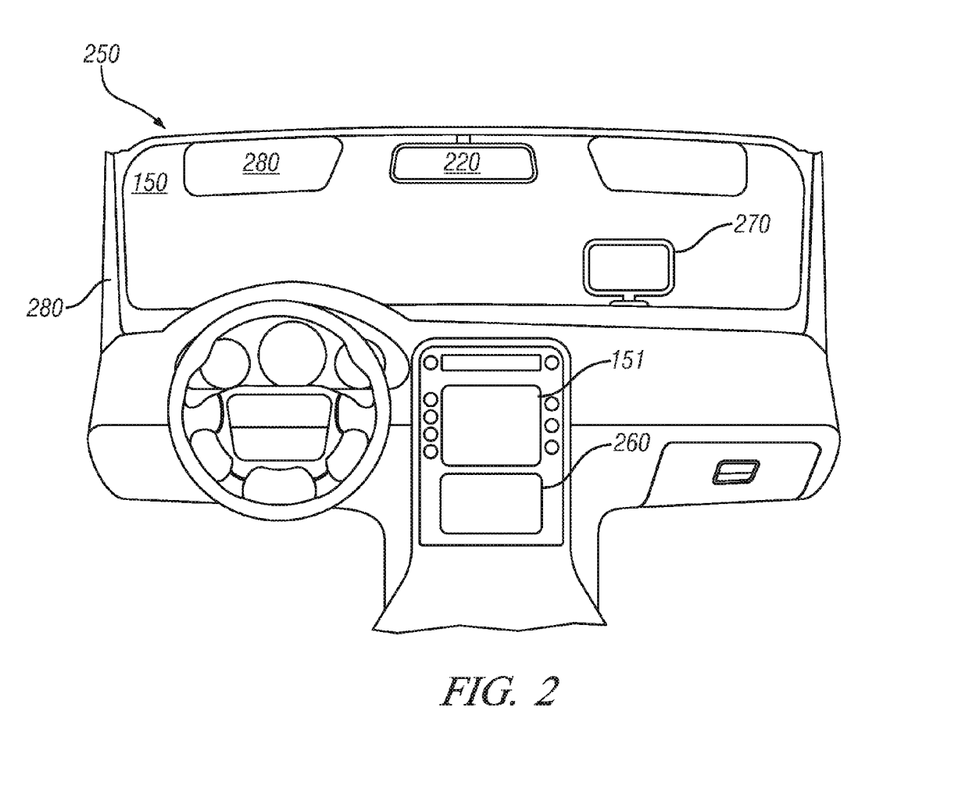
FIG. 2 illustrates graphic projection display embodiments where an image of a view corresponding to the driving scene of a vehicle and graphics can be displayed thereon, in accordance with the present disclosure.

FIG. 2 depicts the graphic projection display 250. The graphic projection display 250 includes embodiments where an image of a view corresponding to the driving scene of the vehicle and a graphic (i.e., graphic representing user-defined content) can be displayed thereon. The graphic projection display 250 includes the substantially transparent windscreen HUD 150, a touch screen display 260, a human machine interface (HMI) 151 having a display, non-transparent components 280 and a display monitor 270 mounted within the interior of the vehicle. It will be understood that all of the embodiments included with the graphic projection display 250 can project an image of a view corresponding to the driving scene of the vehicle. The driving scene can be depicted from the camera system 120. However, the image of the view of the driving scene need not be projected upon the substantially transparent windscreen HUD because the actual driving scene is visible through the HUD 150. User inputs indicated to a portion of the graphic projection display 250 corresponding to the driving scene will be discussed in further detail in FIG. 4 with reference to the UIM 515. It will be understood that the vehicle will typically require one of the embodiments of the graphic projection display 250 for displaying a view corresponding to the driving seen thereupon. However, the graphic projection display 250 could include a combination of the embodiments utilized by the vehicle 100. For instance, an image corresponding to the driving scene of the vehicle could be displayed upon both the HMI 151 and the touch screen display 260.

Figure 3:
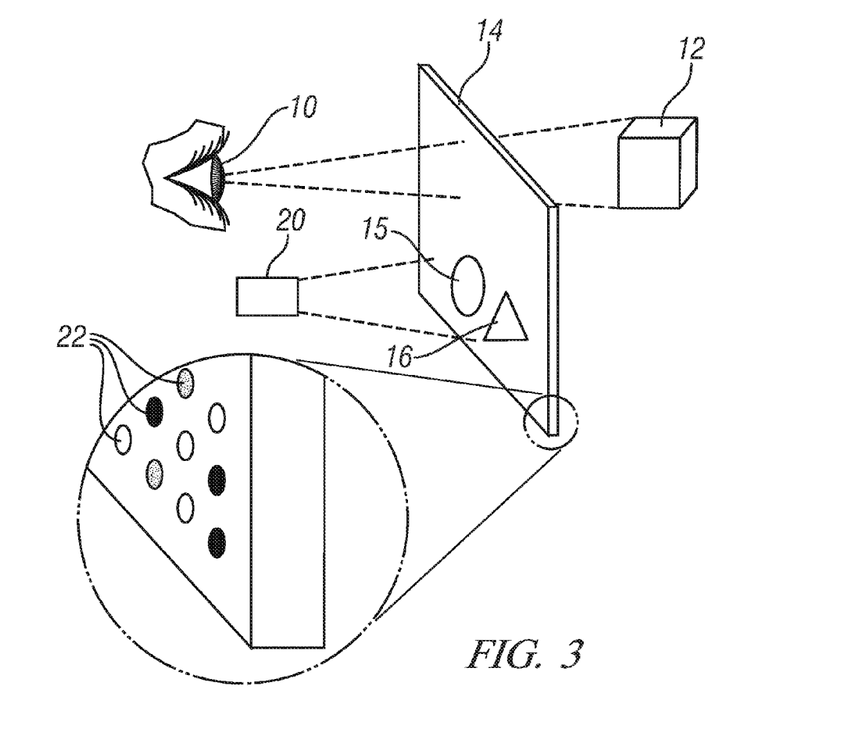
FIG. 3 illustrates a substantially transparent display, in accordance with the present disclosure.

In order to function as a medium through which relevant features are observable while serving as a display device upon which the graphical images may be displayed, the windscreen of the vehicle must be both transparent and capable of displaying images projected by an excitation light source. FIG. 3 illustrates a substantially transparent display, in accordance with the present disclosure. Viewer 10 is able to see an arbitrary object (e.g. cube 12) through substrate 14. Substrate 14 may be transparent or substantially transparent. While viewer 10 sees arbitrary object 12 through substrate 14, the viewer can also see images (e.g. circle 15 and triangle 16) that are created at substrate 14. Substrate 14 may be part of a vehicle windshield, a glass substrate, a plastic substrate, a polymer substrate, or other transparent (or substantially transparent) medium that would be appreciated by one of ordinary skill in the art. Other substrates may complement substrate 14 to provide for tinting, substrate protection, light filtering (e.g. filtering external ultraviolet light), and other functions.

FIG. 3 illustrates illumination of substrate 14 illuminated with excitation light (e.g. ultraviolet light or infrared light) from light sources (e.g. a projector or laser), depicted by device 20. The received excitation light may be absorbed by light emitting material at substrate 14. When the light emitting material receives the excitation light, the light emitting material may emit visible light. Accordingly, images (e.g. circle 15 and triangle 16) may be created at substrate 14 by selectively illuminating substrate 14 with excitation light.

In one embodiment, the excitation light is output by device 20 including a projector. The projector may be a digital projector. the projector may be a micro-mirror array (MMA) projector (e.g. a digital light processing (DLP) projector). A MMA projector that outputs ultraviolet light may be similar to a MMA projector that outputs visible light, except that the color wheel has light filters that are tailored to the ultraviolet light spectrum. the projector may be a liquid crystal display (LCD) projector. the projector may be a liquid crystal on silicon (LCOS) projector. The projector may be an analog projector (e.g. a slide film projector or a movie film projector). One of ordinary skill in the art would appreciate other types of projectors which may be used to project ultraviolet light on substrate 14.

In another embodiment, an excitation light is output from device 20, including a laser. The intensity and/or movement of a laser beam output from device 20 may be modulated to create an image in substrate 14. In down-conversion embodiments, the output from the laser may be ultraviolet light. In up-conversion embodiments, the output from the laser may be infrared light.

FIG. 3 illustrates light emitting material (e.g. light emitting particles 22) dispersed in a substantially transparent substrate. When excitation light is absorbed by the light emitting particles 22, the light emitting particles emit visible light. Accordingly, in down-conversion embodiments, when ultraviolet light is absorbed by light emitting particles 22, visible light is emitted from the light emitting particles. Likewise, in up-conversion embodiments, when infrared light is absorbed by light emitting particles 22, visible light is emitted from the light emitting particles.

FIG. 3 illustrates light emitting material, including light emitting particles 22, dispersed in a substantially transparent substrate. These light emitting particles 22 can be substantially similar particles throughout, or, as illustrated in FIG. 2, the particles can vary in composition. When excitation light is absorbed by the light emitting particles 22, the particles emit visible light. Accordingly, in down-conversion embodiments, when ultraviolet light is absorbed by light emitting particles, visible light is emitted from the light emitting particles. Likewise, in up-conversion embodiments, when infrared light is absorbed by light emitting materials, visible light is emitted from the light emitting particles. Each light emitting particle may be a different type of light emitting material, which emits a different range of wavelengths of visible light in response to a different range of wavelengths of excitation light (e.g. ultraviolet or infrared light).

Light emitting particles 22 may be dispersed throughout substrate 14. In the alternative, as illustrated in FIG. 3, the particles may be disposed on a surface of substrate 14. Light emitting particles 22 may be integrated into substrate 14 by being coated on substrate 14. Light emitting material may be fluorescent material, which emits visible light in response to absorption of electromagnetic radiation (e.g. visible light, ultraviolet light, or infrared light) that is a different wavelength than the emitted visible light. The size of the particles may be smaller than the wavelength of visible light, which may reduce or eliminate visible light scattering by the particles. Examples of particles that are smaller than the wavelength of visible light are nanoparticles or molecules. According to embodiments, each of the light emitting particles has a diameter that is less than about 400 nanometers. each of the light emitting particles may have a diameter that is less than about 300 nanometers. According to embodiments, each of the light emitting particles has a diameter that is less than about 200 nanometers, less than about 100 nanometers, or less than about 50 nanometers. The light emitting particles may be individual molecules.

Similarly, the graphic projection display can include side and rear windows of the vehicle. It will be further understood that graphics can be displayed in a manner such that they can be oriented and interpreted from outside a vehicle. Therefore, a graphic representing user-defined content can be oriented to outside the vehicle. For example, a projector within the vehicle could project graphics that could be viewed upon the windscreen from a sidewalk to the side of the vehicle, with the projected graphic representing the user-defined content not being visible to drivers or to passengers of the vehicle. In another example, an emergency vehicle could display instructions to other vehicles upon the windscreen or side and review windows, for example, with instructions printed in reverse to be better viewed from a rearview mirror.

The HUD 150 can further include a pixelated field of view limited architecture enabling view from a limited direction including one of light emitting particles or microstructures over a predefined region of the windscreen permitting luminescent display in the limited direction while permitting vision therethrough. The pixelated field of view limited architecture will be discussed below with reference to FIGS. 7 and 8 when discussing the projection of viewer-defined dynamically registered graphics upon the HUD 150, and alternatively the non-transparent components 280.

In another embodiment, the graphic projection display 250 can include the HMI device 151 having the display associated therewith for receiving a projected image of a view corresponding to the driving scene of the vehicle and displaying a graphic representing user defined content thereon. HMI 151 includes a computing device where the operator of the vehicle can input commands to control various systems of the vehicle in signal communication with the HMI 151 and receive desirable information. For instance, utilizing the HMI 151, the user can display a graphic representing user-defined content such as a graphical arrow identifying an object of interest on the driving scene. Methods of projection upon HMI displays are known in the art and this disclosure is not meant to be limited to any one method of projection.

In another embodiment, the graphic projection display 250 can include the touch screen display 260 for receiving a projected image of a view corresponding to the driving scene of the vehicle and displaying a graphic representing user-defined content thereon. The touch screen display can be a TSIM 149 of the UIM 515 discussed in detail with reference to FIG. 4. The touch screen display 260 can be the display associated with the HMI device 151 or may be a separate display located within the vehicle. Methods of projection upon touch screen displays are known in the art and this disclosure is not meant to be limited to any one method of projection.

In another embodiment, the graphic projection display 250 can include the display monitor 270 for receiving a projected image of a view corresponding to the driving scene of the vehicle and displaying a graphic representing user-defined content thereon. The display monitor 270 can be mounted on the vehicle dashboard or located somewhere in the vehicle convenient for viewing by the operator. The display monitor 270 can include a monitor associated with a computer utilized in police vehicles.

In another embodiment, the graphic projection display 250 can include the non-transparent components 280 for receiving a projected image of a view corresponding to the driving scene of the vehicle and displaying a graphic describing user-defined content thereon. The non-transparent components 280 can include a dashboard, seats, headrests, structural pillars, roofs, sun visors and steering wheels. The non-transparent components 280 can include a transparent phosphor film reactive to display graphics in response to an excitation projector. Co-pending U.S. application Ser. No. 12/563,407, which is incorporated herein by reference discloses projecting images and graphics upon non-transparent components. In alternative embodiments, the non-transparent components 280 can include the pixelated field of view limited architecture, discussed in FIGS. 7 and 8, when discussing the projection of viewer-defined dynamically registered graphics upon the HUD 150 and alternatively the non-transparent components 280.

Figure 4:
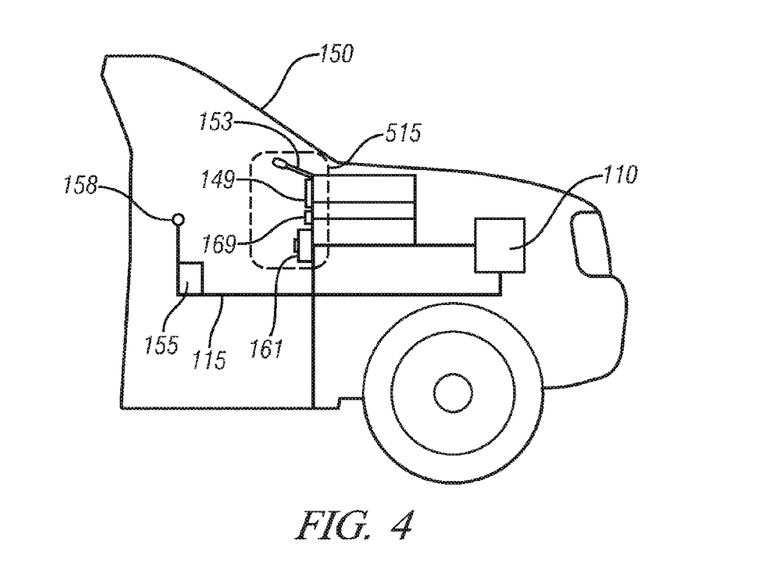
FIG. 4 illustrates the exemplary user input module illustrated in FIG. 1, in accordance with the present disclosure.

Referring to FIG. 4, the exemplary user input module (UIM) 515 for receiving user inputs indicated to a portion of the graphic projection display 250 is illustrated, in accordance with the present disclosure. The user inputs are monitored by the EVS system manager 110 and are eventually utilized for displaying graphics upon the graphic projection display 250 (e.g., HUD 150) corresponding to the driving scene. It will be appreciated that the UIM 515 includes embodiments of user input devices and modules, and that the exemplary vehicle may only include one of the input devices and modules included within the UIM 515 for receiving and monitoring a user input indicated to a portion of the graphic projection display 250. However, embodiments are envisioned where the vehicle can include variations of the user input devices and modules included within the UIM 515 and selected ones can be enabled based on a vehicle user's preference. The UIM 515 includes an imaging device 161, the TSIM 149, the controller device 153 and a keyboard device 169.

The TSIM 149 can be configured to receive touch gestures of a hand or finger of the user upon the module and indicated to a portion of the graphic projection display corresponding to the driving scene. The TSIM 149 can additionally include a display corresponding to the driving scene of the vehicle and configured to dynamically register graphics thereon. As will become apparent, the received touch gestures of the hand of the user provides a touch-based user interface for determining the graphic representing user-defined content.

Various devices are known in the art that can receive touch gestures of a hand or finger of a user. The TSIM 149 can be a touch screen device including a display screen which can identify the occurrence, location and position of a touch inside the display region. The display can correspond to a view of the driving scene of the vehicle. The TSIM 149 can be integrated within the HMI device 151, the display monitor 270, a personal digital assistant (PDA) or a cell phone, all having displays corresponding to the driving scene of the vehicle. Hence, the TSIM 149 facilitates a user to interact with what is displayed on the display (i.e., the driving scene), rather than indirectly with a mouse or touchpad and it lets the user perform the touch gestures without necessitating such middle devices.

Furthermore, various methods are known in the art for monitoring and receiving touch gestures of the hand or finger of the user. In a non-limiting embodiment, the TSIM 149 can be a resistive touch screen display composed of standard glass sheet that is coated with a thin conductive and a resistive metallic sheet, wherein an electrical current travels between the two layers and monitors the touch gesture when the two layers contact each other in the same location and thereby interrupting the electrical current. In another non-limiting embodiment, the TSIM 149 can be a surface wave touch screen display utilizing ultrasonic waves to process user inputs from the screen. In other words, the surface wave touch screen display utilizes a transducer identifying if a signal has been altered by a touch at any movement, where ultrasonic waves flow over the entire screen when the user touches the display at a specific location. In yet another non-limiting embodiment, the TSIM 149 can be a capacitive touch screen display composed of an indium tin oxide sheet that stores electrical charge and is positioned on a glass layer of the display. When the hand or finger of the user input contacts the display, a small quantity of the charge is transmitted to the hand or finger of the user and the quantity of charge on the capacitive sheet reduces. A processor associated therewith computes the comparative variation and determines the precise location where the touch-gesture took place, the location corresponding to the location on the driving scene of the vehicle. In yet another non-limiting embodiment, the TSIM 149 can include infrared touch screen displays. Infrared touch screen displays can react to infrared or thermal waves (i.e., heat). Infrared touch screen displays can further utilize vertical and horizontal infrared sensors around the perimeter to create a grid, and thus pinpoint the exact location where the display screen has been touched by the hand or finger of the user.

It should be appreciated that the TSIM 149 is not to be limited to any of the devices and methods discussed above and that the TSIM 149 only be capable of receiving touch gestures of a hand or finger of the user upon the module 149 and indicated to a portion of the graphic projection display 250 corresponding to the driving scene, wherein the received touch gestures of the hand of the user provides a touch-based user interface for determining the graphic representing the user-defined content.

The controller device 153 includes a mechanism, such as a joystick, mouse, lever, stylus, touch pad or other accessory for receiving user manipulations indicated to a portion of the graphic projection display 250. As will become apparent, the received user manipulations to the controller device 153 can provide a controller-based interface for determining the graphic representing the user-defined content.

The imaging device 161 described above includes capturing images of the hand of the user and utilizing software associated therewith to monitor the location and orientation of the hand of the user to provide an optical image. The images can be captured utilizing infrared or ultraviolet technology. The optical image can be processed to generate three-dimensional (3D) mapping of the hand movement of the user. As will become apparent, the optical image of the hand movement provides a gesture-based user interface for determining the graphic representing the user-defined content. Therefore, user hand movements (i.e., gesturing) detected by the imaging device 161 can be used in place of tactile interface elements such as a mouse, lever, joystick, knob or other accessory. The imaging device 161 requires capturing a sequence of images, wherein the location and the orientation of the hand of the user is monitored for each image to provide the optical image of the hand movement of the user. The software associated with the imaging device 161 can be integrated within the imaging device 161 and in signal communication with the EVS system manager 110 by suitable dedicated circuitry. Additionally, the software associated with the imaging device 161 can be integrated within the EVS system manager 110.

Various methods are known in the art that use imaging devices to process optical images based on the monitored location and orientation of an object (i.e., a hand) to generate 3D mapping of the object. PCT International Publication WO 2007/043036, which is incorporated herein by reference, discloses a method and system based on projecting a laser speckle pattern onto an object, and then analyzing an image of the pattern on the object. U.S. Pat. No. 6,100,517, which is incorporated herein by reference, discloses a method of using pulsed modulation in order to measure time of flight of light from an object to a detector, where a camera creates an image indicating distances to points in objects in a scene. U.S. Publication No. 2010/0020078 A1, which is incorporated herein by reference, discloses a method of illuminating an object with beams of radiation and generating intensity-based 3D mapping of the object. The present disclosure is not limited to any of the methods discussed above, as long as the imaging device 161 can monitor the location and the orientation of a hand of the user and process an optical image of hand movement of the user based on the monitored location and orientation of the hand of the user, wherein the optical image of the hand movement can provide a gesture-based user interface for determining the graphic representing user-defined content.

The keyboard device 169 receives user keystrokes to the keyboard device indicated to a portion of the graphic projection display 250. The keyboard device 169 can be used in association with other devices such as the controller device having a joystick or the HMI 151. As will become apparent, the received user keystrokes to the keyboard device 169 provides a key-based interface for determining the graphic representing the user-defined content.

Figure 5:
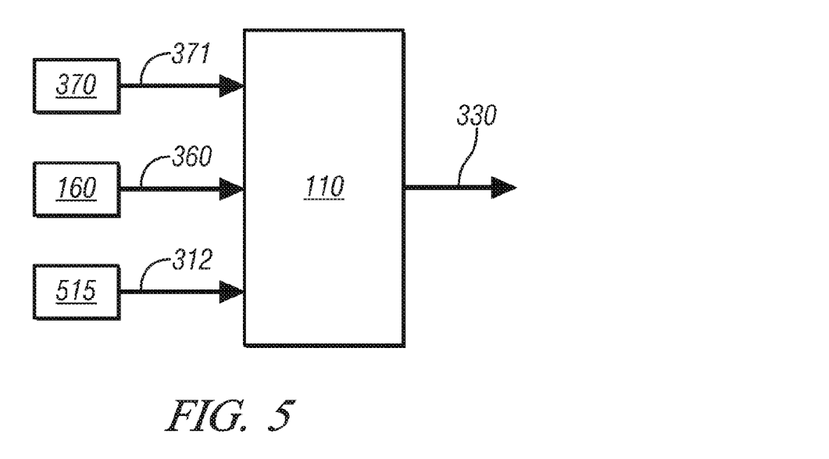
FIG. 5 illustrates an exemplary information flow for dynamically registering a graphic on a driving scene utilizing the graphic projection display, in accordance with the present disclosure.

FIG. 5 illustrates an exemplary information flow for dynamically registering a graphic on a driving scene utilizing the graphic projection display 250 including an EVS system manager 110 monitoring inputs from the occupant eye location sensing system 160, inputs from a vehicle location and orientation module 370 and inputs from the UIM 515 to thereby generate display requirements 330, in accordance with the present disclosure. The graphic can include a graphic representing user-defined content. The graphic can further include a feedback graphic (e.g., a cursor) illustrating movement of the monitored input indicated to the portion of the graphic projection display. In other words, the feedback graphic illustrates movement of the monitored user input to align the user input for displaying the graphic describing the user-defined content at a desired location upon the graphic projection display corresponding to the driving scene.

With reference to FIGS. 1 and 5, the occupant eye location sensing system 160 includes sensors known in the art to approximate a location of the head of an occupant and further the orientation or gaze location of the eyes of the occupant. An occupant can be an operator of the vehicle or a passenger within the vehicle. Head and eye sensing devices are known in the art and will not be discussed in great detail herein. For the purposes of this disclosure, a camera based device is utilized in combination with image recognition software to estimate a three-dimensional head location within the vehicle, able to be coordinated with a vehicle coordinate system, and a direction of occupant's gaze based upon image recognition programming. An eye location input 360 is input to the EVS system manager 110.

A current location and orientation of the vehicle can be determined by methods known in the art such as, but not limited to, monitoring the GPS device 140 in conjunction with a 3D map database and a digital compass including detailed information relating to a global coordinate received by the GPS device 140 regarding the current location of the vehicle. The current location and orientation can also be determined by vehicle kinematics including at least vehicle speed and yaw rate, available through sensors monitoring vehicle operation and/or monitoring accelerometer readings. Utilizing the methods discussed above, the vehicle location and orientation module 370 generates a vehicle location and orientation input 371 to the EVS system manager 110.

The UIM 515 can be configured to monitor the user input location indicated to a portion of graphic projection display corresponding to the driving scene. In other words, the location of the user input refers to the location of the indicated portion upon the graphic projection display corresponding to the driving scene at which the monitored user input is directed towards. A user input location 312 is input to the EVS system manager 110.

The EVS system manager thereby 110 monitors the eye location input 360, the vehicle location and orientation input 371 and the user input location 312 to thereby generate the display requirements 330 for dynamically registering the graphic upon the graphic projection display. It is appreciated that if the graphic includes the feedback graphic, it may only be necessary to monitor the eye location input 360 and the user input location 371 to generate the display requirements 330 for dynamically registering the feedback graphic upon the graphic projection display 250.

Therefore, based on the occupant eye location, the user input location and the current location and orientation of the vehicle, an estimated point of intersection between an object on the driving scene the operator desires to view and the operator's eyes can be determined upon the display, thereby enabling graphical images to by dynamically registered to a location upon the display corresponding to the driving scene of the vehicle, such that the occupant of the vehicle can view the object on the driving scene and the graphic representing the user-defined content.

Further embodiments envisioned include monitoring the data related to the operator gaze location and dynamically updating the graphic describing the user-defined content based on the operator gaze location. For instance, emphasis can be added to the graphic representing the user-defined content based on an increasing distance between the operator gaze location and the location at which the graphic is registered upon the graphic projection display 250. Likewise, emphasis can be decreased to the graphic representing the user-defined content based on a decreasing distance between the operator gaze location and the location at which the graphic is registered upon the graphic projection display.

Figure 6:
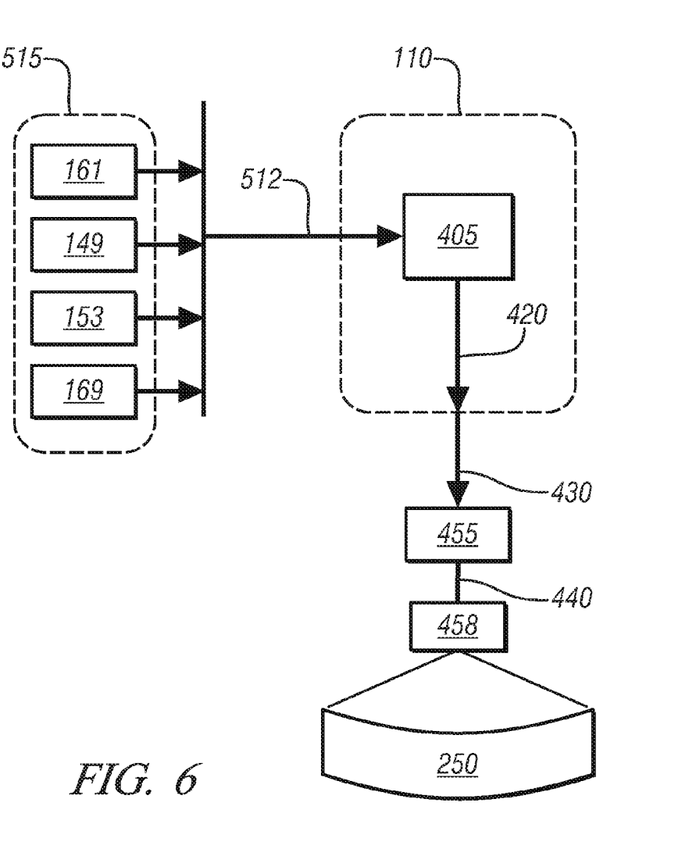
FIG. 6 illustrates depicts an exemplary information flow to determine a graphic representing user-defined content, in accordance with the present disclosure.

Referring to FIG. 6, a schematic depiction of an exemplary information flow to determine a graphic representing user-defined content where the graphic is dynamically registered and displayed upon a graphic projection display 250 corresponding to the driving scene of the vehicle. The information flow includes an EVS system manager 110 monitoring information from various sources and generating display requirements 430, graphics module 455 monitoring the display requirements 430 from the EVS system manager and generating graphics commands 440, and a graphics projection display 250. As aforementioned, the graphic projection display 250 can include the substantially transparent windscreen head-up display 150, the non-transparent components 280, the vehicle touch screen 260, the HMI device 151, the display monitor 270 or any screen or display displaying projected graphics and an image of a view corresponding to the road scene of the vehicle. It is appreciated that the graphic projection display 250 is not meant to be limited to any of the above displays. Graphic projection module 458 projects light upon the graphic projection display 250.

The EVS system manager 110 includes and monitors a content module 405. Monitoring the content module 405 includes monitoring a user input 512 indicated to a portion of the graphic projection display 250. The user input 512 is generated by the UIM 515 that can include one of the imaging device 161, the TSIM 149, the controller device 153 or the keyboard device 169. The user input from each of the imaging device 161, the TSIM 149, the controller device 153 or the keyboard device 169 is discussed in further detail below. The content module 405 determines user-defined content based on the user input 512 and a graphic 420 describing the user-defined content. The content module 405 determines a location corresponding to the user input 512 indicated to the portion of the graphic projection display to commence displaying the graphic 420. Hence, a user can determine a graphic representing user-defined content corresponding to a location on the driving scene. The graphic 420 representing the user-defined content, once displayed, can be communicated between the operator of the vehicle, a front-seat occupant and rear seat occupants. Additionally, the graphic 420 can be communicated to occupants of other vehicles on the roadway or as an off-site virtual communication.

The graphics module 455 utilizing the display requirements 430 generated by the EVS system manager 110 and based upon the graphic 420 representing the user-defined content, generates the graphic 420 as a graphics command 440 to the graphics projection module 458. It will be appreciated that the display requirements 430 include dynamically registering a location of the graphic upon the graphic projection display corresponding to the driving scene of the vehicle. Dynamically registering the graphic upon the graphic projection display corresponding to the driving scene is discussed above and will not be discussed in detail herein. The graphics projection module 458 displays the graphic onto the driving scene of the vehicle utilizing the graphic projection display 250. It will be further appreciated when the graphic projection display 250 includes one of the substantially transparent windscreen head-up display 150, rear or side windows or the non-transparent components 280, the graphic module 455 and the graphic projection module 458 correspond to the EVS graphics engine 155 and the graphic projection system 158, respectively.

Embodiments envisioned include the graphic including a highlighted trace graphic representing and illustrating the user-input indicated the portion of the graphic projection display. For instance, an occupant of a vehicle could trace a mountain range contour on the driving scene for communicating with other occupants such that the trace of the mountain range contour is a highlighted trace graphic representing and illustrating the mountain range contour on the driving scene. The graphic representing the user-defined content can further include a textual graphic where the textual graphic is indicated to a portion of the graphic projection display. Likewise, the graphic can include a registered graphic such as a box utilized to identify, describe or otherwise communicate with reference to an object on the driving scene. It will be appreciated that registered graphics can be capable of manipulation based on the monitored user-input. For instance, a user may desire to display a box graphic encompassing a building to identify and illustrate the building. The box graphic can be manipulated by resizing the registered graphic to increase or decrease the size of the box. Likewise, the box graphic can be positioned to another location (e.g., portion) upon the graphic projection display. For instance, a grab-and-drag function could re-locate the registered graphic. It is understood that the graphic 420 describing the user-defined content can be dynamically registered, determined and displayed in real-time based on the user input 512.

As aforementioned, the feedback graphic can be utilized to illustrate movement of the monitored user input indicated to the portion of the graphic projection display. In other words, the feedback graphic illustrates movement of the monitored user input to align the user input for determining the graphic representing the user-defined content at a desired location upon the graphic projection display corresponding to the road scene. The feedback graphic can be a registered graphic such as a cursor graphic. Embodiments further envisioned include the feedback graphic as a content-specific graphic. For instance, if the user-defined content includes a graphic to be displayed that shades a section of road on the road scene, the content-specific feedback graphic could be a paint-brush graphic indicating that the user desires to shade or paint the section of road. In another non-limiting example, if the user desires to outline or trace an object on the road scene, the content-specific registered feedback graphic could be a pencil/pen graphic indicating that the user desires to trace around or otherwise outline the object on the road scene. It is understood that the feedback graphic illustrating the movement of the user-defined content can be dynamically registered, determined and displayed in real-time based on the movement of the user input 512.

In an exemplary embodiment, the monitored user input 512 indicated to the portion of the graphic projection display includes utilizing the imaging device 161 monitoring a location and an orientation of a hand or finger of the user and processing an optical image of hand or finger movement of the user based on the monitored location and orientation of the hand or finger of the user. The optical image of the hand or finger movement can provide a gesture-based user interface for determining the graphic describing the user-defined content. For instance, a user can wave a hand or finger in proximity of the imaging device in a manner indicated to the portion of the graphic projection display to determine the user-defined content and the graphic representing the user-defined content.

In another exemplary embodiment, the monitored user input 512 indicated to the portion of the graphic projection display includes utilizing the TSIM 149 for receiving touch gestures of a hand or finger of the user upon the display of the TSIM 149. The TSIM 149 can include a display including an image of a view corresponding to the driving scene. The received touch gestures are indicated to a portion of the graphic projection display, wherein the touch gestures of the hand or finger of the user can provide a touch-based user interface for determining the user-defined content and the graphic representing the user-defined content. Hence, the TSIM 149 can allow the user to determine the user-defined content and the graphic describing the user-defined content directly onto a desired location of the driving scene because the image of the view of the driving scene can be displayed upon the display of the TSIM 149. It is appreciated that the feedback graphic would not have practicality because the touch-based interface allows the hand or finger to directly align the user input to the indicated portion of the graphic projection display.

In another exemplary embodiment, the monitored user input 512 indicated to the portion of the graphic projection display includes utilizing the controller device 153 for receiving user manipulation to- or upon- the controller device 153. Hence, the received user manipulation to the controller device 153 provides a controller-based interface for determining the user-defined content and the graphic 420 representing the user-defined content. It will be appreciated that the controller device 153 is in signal communication with the graphic projection display. In a non-limiting example, the controller device 153 can be utilized in association with- or integrated within- the HMI device 151 including a display associated therewith. For instance, the display can identify the user input when the controller device 153 includes a stylus manipulated by the user and in direct contact with the display. In another non-limiting example, the controller device 153 including a joystick can direct a user input indicated to a portion of the graphic projection display corresponding to the driving scene. It is appreciated that a feedback graphic monitoring movement of the monitored user input would be beneficial for controller-based interfaces that include a joystick, mouse, touch pad, or knob but would not have any application to a controller-based interface such as the stylus.

In another exemplary embodiment, the monitored user input 512 indicated to the portion of the graphic projection display includes utilizing the keyboard device 169 for receiving user keystrokes to the keyboard device. Hence, the received key strokes to the keyboard device 169 provide a key-based interface for determining the user-defined content and the graphic 420 representing the user-defined content. It is appreciated that the keyboard device 169 is in signal communication with the graphic projection display 250. The keyboard device 169 enables the user to type textual messages utilizing textual graphics to represent the textual messages.

Further embodiments envisioned include a pixelated field of view limited architecture enabling a first viewer looking at the HUD 150 from a first direction seeing one graphic, and a second viewer looking at the HUD 150 from a second direction either not seeing the particular graphic or seeing a different graphic than the first viewer. Such a system allows a driver and a passenger to view a graphic representing user-defined content based upon a user input indicated to a portion of the HUD 150 each from perspectives respective to each the driver and the passenger. Hence, two graphics can be projected, where each of the graphics is respective to one of the driver and passenger and representing the user-defined content. Projecting dynamically registered graphics respective to each the driver and the passenger enables each graphic to correctly describe the user-defined content. For instance, based on a driver-input indicated to a portion on the HUD where a cloud is located the driver may desire to project a graphic outlining the cloud upon the HUD. This graphic is dynamically registered from a perspective to the driver, and thus, would not have relevance to the passenger due to the passenger having a different viewing location and data related to eye location. Therefore, a second graphic (i.e., second viewer-defined dynamically registered graphic) can be projected such that the passenger can view the graphic outlining the cloud based on the driver-input indicated to the portion of the HUD 150 from a perspective to the passenger. Further, the graphic perspective the driver can be limited to viewing by the passenger and the graphic perspective to the passenger can be limited to viewing by the driver.

Figure 7:
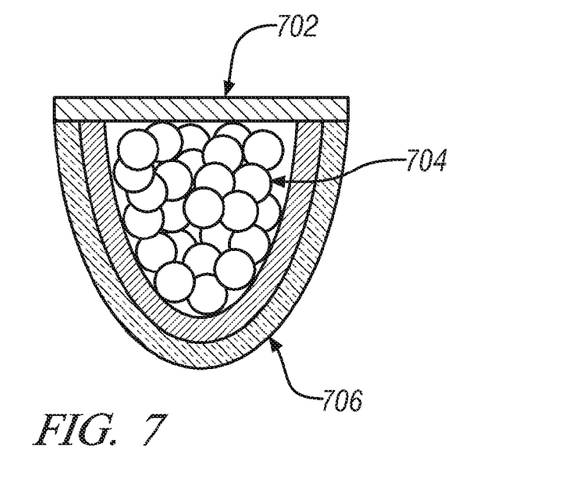
FIGS. 7 and 8 illustrate an exemplary use of a pixelated field of view limited architecture, in accordance with the present disclosure.
Figure 8:
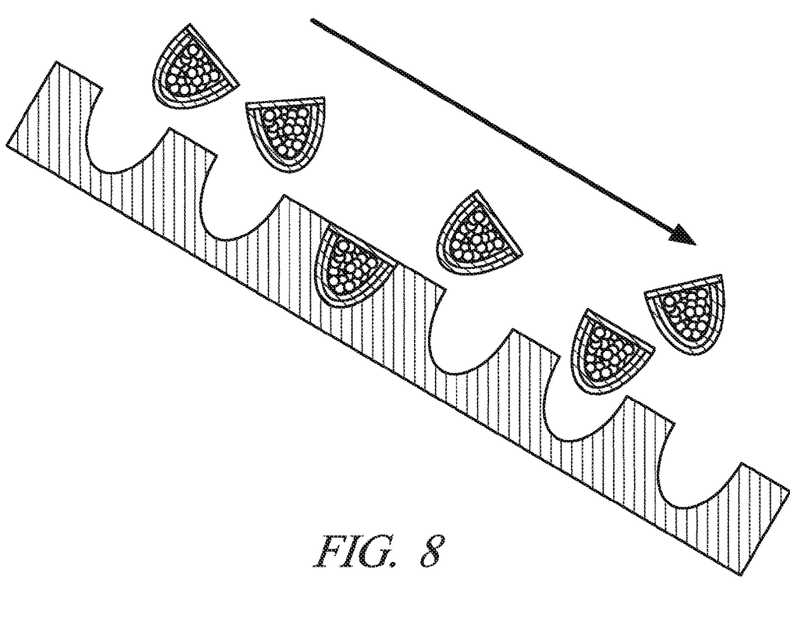

An exemplary embodiment of a pixelated field of view limited architecture enabling image view from a limited direction includes use of microstructures or an arrangement of particles accepting an excitation light as described above and emitting light in a limited direction. Co-pending U.S. application Ser. No. 12/564,899, which is incorporated herein by reference discloses a pixelated field of view limited architecture. FIGS. 7 and 8 illustrate an exemplary use of a pixelated field of view limited architecture, in accordance with the present disclosure. FIG. 7 illustrates an exemplary emitter, capable of emitting light to a limited field of view. The exemplary emitter includes a UV transparent encapsulant 702, for example, made from $SiO_2$, filled with an LIF material 704 that fluoresces visible wavelengths when irradiated with ultraviolet radiation, with a parabola shaped narrow band multilayer reflection structure 706. In this exemplary embodiment, a thin film of these emitters is deposited as onto a polymer. In preparation for the film, impressions in the shape of parabolas similar to the shape formed in the emitters are embossed into the polymer material. The emitters are deposited by chemical vapor deposition onto the polymer substrate, filling the parabola impressions with emitters. FIG. 8 illustrates an exemplary process to create the necessary structure of emitters aligned to a polymer substrate in order to enable limited field of view viewing. By an exemplary process such as etching, free standing parabolas that are filled with emitting material are created by releasing them from the substrate. The removal from the polymer substrate can be also be accomplished by dissolving the plastic substrate with a suitable solvent. The free standing parabolas are then nested into divots that have been created in the glass substrate by photolithographic methods or embossing. The method of mating the parabola to the divot can be accomplished by a process such as fluidic self assembly, similar to that practiced by Alien Technology, wherein the parabolas are flowed over the substrate and parabola-divot mating occurs in a statistical fashion.

Based upon the methods discussed above including the method for dynamically registering a graphic discussed in FIG. 5, a viewer-defined dynamically registered graphic can be projected upon the substantially transparent windscreen head-up display 150 corresponding to the driving scene of the vehicle. Based on monitoring the user input indicated to the portion of the HUD, the viewer-defined dynamically registered graphic to be projected upon the HUD can be determined. Thus, the pixelated field of view enables graphic view from a limited direction (e.g., first limited direction and/or second limited direction). The viewer-defined dynamically registered graphic can include a first viewer-defined dynamically registered graphic based on a first viewer location and a second viewer-defined dynamically registered graphic based on a second viewer location. It is understood that both of the first and second viewer-defined dynamically registered graphics can be projected upon the substantially transparent windscreen HUD. Further, the first viewer-defined dynamically registered graphic based upon the first viewer location is further based upon utilizing the pixelated field of view enabling view of the graphic from a first limited direction oriented toward the first viewer location. It will be understood that the first viewer location can correspond to the driver of the vehicle. Likewise, the second viewer-defined dynamically registered graphic based upon the second viewer location is further based upon utilizing the pixelated field of view enabling view of the graphic from a second limited direction oriented toward the second viewer location. It will be understood that the second viewer location can correspond to one of the passenger seats in the vehicle. Likewise, the method of dynamic registration discussed in FIG. 5 can further include monitoring data related to a second viewer eye location, wherein the second viewer eye location corresponds to one of the passengers at the second viewer location. It is understood that monitoring an occupant eye location can include monitoring data related to a first viewer eye location and/or the second viewer eye location.

The method of pixelated field of view limited architecture as discussed above is applied to the substantially transparent windscreen HUD 150. However, this method can additionally be applied to the non-transparent components 280.

Figure 9:
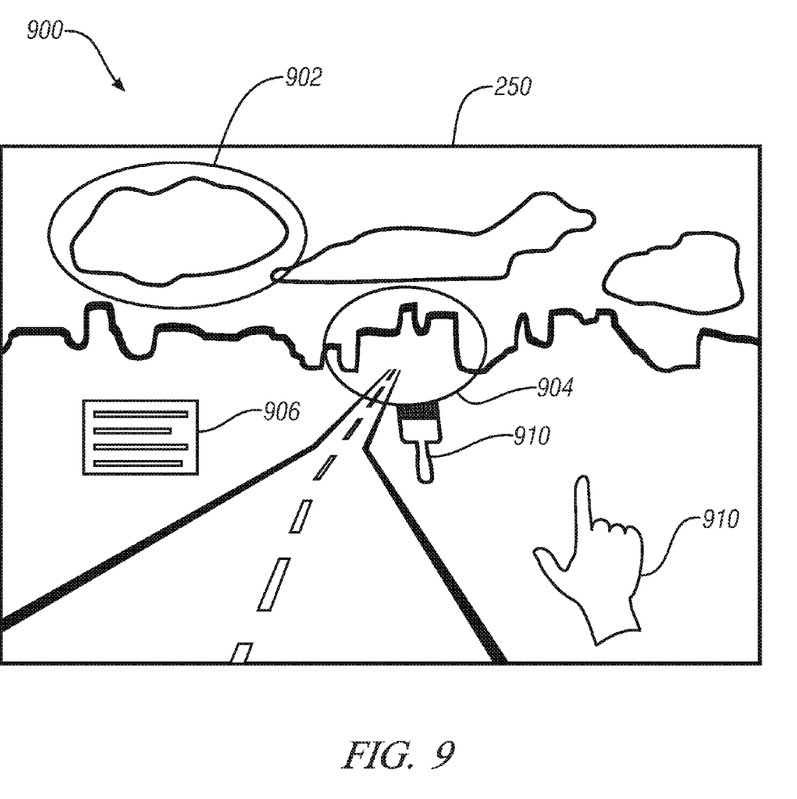
FIG. 9 illustrates a driving scene including a graphic dynamically registered upon a graphic projection display of a vehicle, the graphic projection display corresponds to the driving scene of the vehicle, in accordance with the present disclosure.

Referring to FIG. 9, a driving scene 900 is illustrated upon a graphic projection display 250 of a vehicle. If the graphic projection display 250 includes a substantially transparent windscreen head-up display, the driving scene 900 is illustrated through the substantially transparent windscreen head-up display. Otherwise, an image of a view of corresponding to the driving scene is projected upon the graphic projection display. Graphics 902, 904 and 906 represent user-defined content. For instance a user-input indicated to the portion of the graphic projection display 250 determines graphic 902, 904 and 906. In this non-limiting example, the user-defined content is illustrating a cloud indicated by registered circle graphic 902 and a section of a mountain range indicated by highlighted trace graphic 904. Textual graphic 906 can be a textual message from a passenger within the vehicle to a driver communicating that the current section of highway is the passenger's favorite section of highway. Feedback graphics 910 illustrate movement of the monitored user input indicated to the portion of the graphic projection display. It will be understood that only one of feedback graphics 910 would displayed. One feedback graphic 910 is a content-specific graphic indicating a paintbrush such that the highlighted trace graphic 904 representing the user-defined content is to be a painted trace around the section of mountain range. The other feedback graphic 912 is merely a cursor, in this case a hand, because the feedback graphic 912 illustrates movement of the monitored user input utilizing the gesture-based interface to align the user input for displaying the graphic describing the user-defined content at a desired location upon the graphic projection display corresponding to the driving scene.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to dynamically register a graphic on a driving scene of a vehicle utilizing a graphic projection display, comprising:
monitoring a user input corresponding to a first viewer, the user input indicated to a portion of the graphic projection display;
monitoring a first location corresponding to the first viewer;
monitoring a second location corresponding to a second viewer;
determining a user-defined content based on the monitored user input indicated to the portion of the graphic projection display;
determining first and second graphics each representing the user-defined content, wherein the first graphic is respective to the first location corresponding to the first viewer and the second graphic is respective to the second location corresponding to the second viewer;
dynamically registering first and second viewer-defined locations of respective ones of the first and second graphics upon the graphic projection display corresponding to the driving scene of the vehicle, comprising
the first graphic dynamically registered at the first viewer-defined location upon the graphic projection display based upon the user input and the first location corresponding to the first viewer, and
the second graphic dynamically registered at the second viewer-defined location upon the graphic projection display based upon the user input and the second location corresponding to the second viewer; and
displaying the first and second graphics upon the graphic projection display.

2. The method of claim 1 wherein the graphic projection display comprises a substantially transparent windscreen head-up display comprising a pixelated field of view enabling graphic view from a limited direction comprising one of light emitting particles or microstructures over a predefined region of the windscreen permitting luminescent display in the limited direction while permitting vision therethrough.

3. The method of claim 1 wherein the graphic projection display comprises one of a touch screen display, a human machine interface display, a non-transparent component and a display monitor.

4. The method of claim 3 further comprising:
projecting an image of a view corresponding to the driving scene of the vehicle upon the graphic projection display.

5. The method of claim 1 wherein the first and second graphics representing the user-defined content comprises a highlighted trace graphic illustrating movement of the monitored user-input.

6. The method of claim 1 wherein the first and second graphics representing the user-defined content comprises registered first and second graphics capable of manipulation based on the monitored user-input.

7. The method of claim 1 wherein the first and second graphics representing the user-defined content comprises a first and second textual graphics.

8. The method of claim 1 further comprising:
determining a feedback graphic illustrating movement of the monitored user input indicated to the portion of the graphic projection display;
dynamically registering a location of the feedback graphic upon the graphic projection display corresponding to the driving scene of the vehicle; and
displaying the feedback graphic upon the graphic projection display.

9. The method of claim 8 wherein the feedback graphic is a content-specific graphic.

10. The method of claim 1 further comprising monitoring an occupant eye location; and
wherein dynamically registering first and second viewer-defined locations of respective ones of the first and second graphics upon the graphic projection display corresponding to the driving scene is based upon the occupant eye location.

11. Method to dynamically register a graphic on a driving scene of a vehicle utilizing a graphic projection display, comprising:
monitoring a user input indicated to a portion of the graphic projection display;
monitoring an occupant eye location
determining a graphic representing a user-defined content based on the monitored user input indicated to the portion of the graphic projection display;
dynamically registering a location of the graphic upon the graphic projection display corresponding to the driving scene of the vehicle based upon the occupant eye location;
displaying the graphic upon the graphic projection display;
monitoring an operator gaze location;
dynamically updating the graphic representing the user-defined content based on the operator gaze location; and
wherein dynamically updating the graphic representing the user-defined content comprises increasing emphasis to the graphic based on an increasing distance between the operator gaze location and the location at which the graphic is registered upon the graphic projection display;
wherein dynamically updating the graphic representing the user-defined content comprises decreasing emphasis to the graphic based on a decreasing distance between the operator gaze location and the location at which the graphic is registered upon the graphic projection display.

12. The method of claim 1 wherein monitoring the user input indicated to the portion of the graphic projection display comprises:
monitoring a location and an orientation of a hand of the user;
processing an optical image of hand movement of the user based on the monitored location and orientation of the hand of the user; and
wherein the optical image of the hand movement provides a gesture-based user interface for determining the first and second graphics representing the user-defined content.

13. The method of claim 1 wherein monitoring the user input indicated to the portion of the graphic projection display comprises:
receiving touch gestures of a hand of the user upon a touch screen, the touch gestures indicated to the portion of the graphic projection display; and
wherein the received touch gestures provides a touch-based user interface for determining the first and second graphics representing the user-defined content.

14. The method of claim 1 wherein monitoring the user input indicated to the portion of the graphic projection display comprises:
receiving user manipulations at a controller device, the user manipulations indicated to the portion of the graphic projection display; and
wherein the received user manipulations provides a controller-based interface for determining the first and second graphics representing the user-defined content.

15. The method of claim 1 wherein monitoring the user input indicated to the portion of the graphic projection display comprises:
receiving user keystrokes at a keyboard device, the user keystrokes indicated to the portion of the graphic projection display; and
wherein the received key strokes provides a key-based interface for determining the first and second graphics representing the user-defined content.

16. Method to project a viewer-defined dynamically registered graphic upon a substantially transparent windscreen head-up display corresponding to the driving scene of the vehicle, comprising:
monitoring a user input corresponding to a first viewer, the user input indicated to a portion of the substantially transparent windscreen head-up display;
monitoring a first location corresponding to the first viewer;
monitoring a second location corresponding to a second viewer;
determining first and second viewer-defined dynamically registered graphics, comprising
the first viewer-defined dynamically registered graphic projected upon the substantially transparent windscreen head-up display corresponding to the driving scene based upon the user input and the first location corresponding to the first viewer, wherein the first graphic represents user-defined content based upon the user input corresponding to the first user, and
the second viewer-defined dynamically registered graphic projected upon the substantially transparent windscreen head-up display corresponding to the driving scene based upon the user input corresponding to the first viewer and the second location corresponding to the second viewer, wherein the second graphic represents the user-defined content based upon the user input corresponding to the first user; and
projecting the first and second graphics upon the substantially transparent windscreen head-up display;
wherein the substantially transparent windscreen head up display comprises a pixelated field of view enabling graphic view from a limited direction comprising one of light emitting particles or microstructures over a pre-defined region of the windscreen permitting luminescent display in the limited direction while permitting vision therethrough.

17. The method of claim 16 wherein the first viewer-defined dynamically registered graphic based upon the first location is further based upon utilizing the pixelated field of view enabling graphic view from a first limited direction oriented toward the first location corresponding to the first viewer; and
wherein the second defined dynamically registered graphic based upon the user input and the second viewer location is further based upon utilizing the pixelated field of view enabling graphic view from a second limited direction oriented toward the second location corresponding to the second viewer.

18. The method of claim 16 further comprising:
monitoring a first viewer eye location; and
monitoring a second viewer eye location;
wherein the first viewer-defined dynamically registered graphic based upon the user input and the first location is further based upon the first viewer eye location;
wherein the second viewer-defined dynamically registered graphic based upon the user input and the second location is further based upon the second viewer eye location.

19. System to dynamically register a graphic on a driving scene of a vehicle utilizing a graphic projection display, comprising:
an enhanced vision system system manager:
monitoring a user input corresponding to a first viewer, the user input indicated to a portion of the graphic projection display;
monitoring a first location corresponding to the first viewer;
monitoring a second location corresponding to a second viewer;
determining a user-defined content based on the monitored user input indicated to the portion of the graphic projection display;
determining first and second graphics each representing the user-defined content, wherein the first graphic is respective to the first location corresponding to the first viewer and the second graphic is respective to the second location corresponding to the second viewer;
dynamically registering first and second viewer-defined locations of respective ones of the first and second graphics upon the graphic projection display corresponding to the driving scene of the vehicle, comprising
the first graphic dynamically registered at the first viewer-defined location upon the graphic projection display based upon the user input and the first location corresponding to the first viewer, and
the second graphic dynamically registered at the second viewer-defined location upon the graphic projection display based upon the user input and the second location corresponding to the second viewer;
a graphics system generating the first and second graphics graphic representing the user-defined content; and a graphics projection system communicating with the graphics system and displaying the first and second graphics representing the user-defined content upon the graphic projection display.

* * * * *